(12) United States Patent
Candelore et al.

(10) Patent No.: US 11,042,354 B1
(45) Date of Patent: Jun. 22, 2021

(54) AUDIO ADJUSTMENT CONTROL FOR WIRELESS DEVICE

(71) Applicant: SONY CORPORATION, Tokyo (JP)

(72) Inventors: Brant Candelore, San Diego, CA (US); Peter Shintani, San Diego, CA (US)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/811,040

(22) Filed: Mar. 6, 2020

(51) Int. Cl.
| | |
|---|---|
| *H04R 5/033* | (2006.01) |
| *H03G 3/20* | (2006.01) |
| *G06F 3/16* | (2006.01) |
| *H04R 3/00* | (2006.01) |

(52) U.S. Cl.
CPC .............. *G06F 3/165* (2013.01); *G06F 3/162* (2013.01); *H04R 3/00* (2013.01); *H04R 2420/07* (2013.01)

(58) Field of Classification Search
CPC .............. H04R 5/033; H04R 2420/05; H04R 2420/03; H04M 1/6058; H03G 3/20
USPC ........................................ 381/74, 104, 107
See application file for complete search history.

(56) References Cited

U.S. PATENT DOCUMENTS

| | | | |
|---|---|---|---|
| 10,268,444 B2 | 4/2019 | Jiang et al. | |
| 2015/0350766 A1* | 12/2015 | Schobel | H04M 19/045 381/77 |
| 2016/0173046 A1 | 6/2016 | Lee | |

FOREIGN PATENT DOCUMENTS

CN    107623776 A    1/2018

OTHER PUBLICATIONS

Mishaal Rahman, "Android Pie adds Bluetooth volume memory feature to remember headset volumes", XDA Developers, URL: https://www.xda-developers.com/android-pie-bluetooth-volume-memory/, Aug. 6, 2018, 03 pages.
"What's new for Bluetooth in ColorOS 6.0", OPPO, Nov. 1, 2019, 03 pages.

* cited by examiner

*Primary Examiner* — George C Monikang
(74) *Attorney, Agent, or Firm* — Chip Law Group

(57) ABSTRACT

An electronic device and a method for audio adjustment control for a wireless device is provided. The electronic device detects a new connection, that differs from a prior connection, between the electronic device and the wireless device. An audio communication through the prior connection is based on first audio information stored in the electronic device. The electronic device further receives second audio information from the wireless device based on the new connection. The second audio information is different from the stored first audio information and an audio setting of the wireless device is configured based on the second audio information. The electronic device further adjusts the stored first audio information based on the second audio information received from the wireless device and transmits an audio stream to the wireless device based on the adjusted first audio information.

18 Claims, 5 Drawing Sheets

AUDIO ADJUSTMENT CONTROL FOR WIRELESS DEVICE

CROSS-REFERENCE TO RELATED APPLICATIONS/INCORPORATION BY REFERENCE

None.

FIELD

Various embodiments of the disclosure relate to audio adjustments. More specifically, various embodiments of the disclosure relate to an electronic device and a method for adjustment of audio for connected wireless devices.

BACKGROUND

Recent advancements in wireless technologies have resulted in the evolution of various wireless audio devices. Typically, such wireless audio devices (such as wireless headphones or sound systems) connect to a master device (such as a mobile phone) that transmits an audio stream to the wireless audio devices for audio playback. However, various audio settings (such as a volume level) of the wireless audio device or the master device have to be manually controlled every time the wireless audio device connects with the master device, which may lead to an unpleasant user experience for audio content playback. Therefore, a smart system may be required which may enhance user experience whenever the wireless audio device connects to the same master device for content playback.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and a method for audio adjustment control for wireless connected devices is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
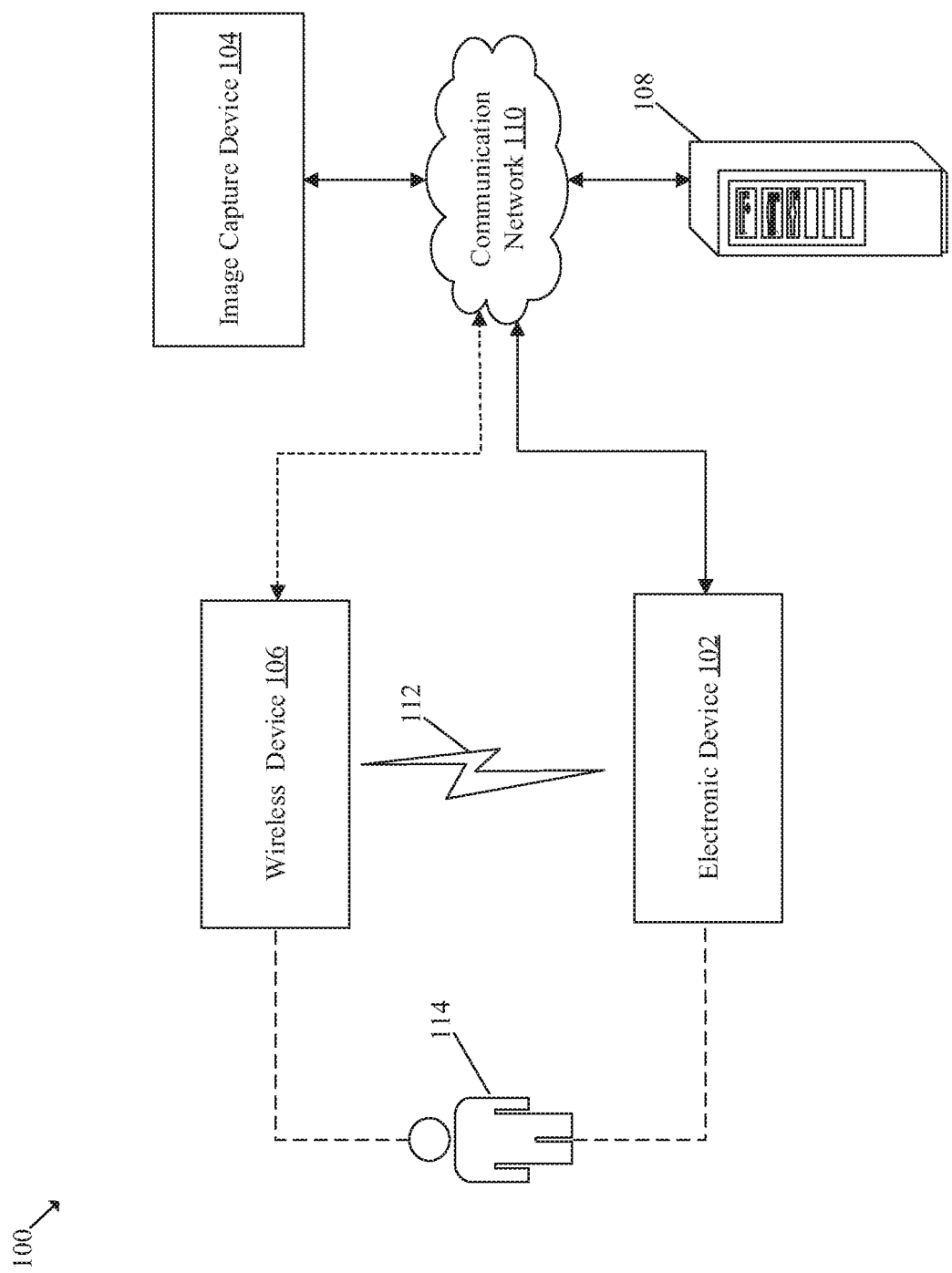
FIG. 1 is a diagram that illustrates an exemplary network environment for audio adjustment control for a wireless device, in accordance with an embodiment of the disclosure.

The following described implementations may be found in the disclosed electronic device and a method for automatic control of audio adjustment for a wireless device, based on a two-way communication between the electronic device and the wireless device. Exemplary aspects of the disclosure provide an electronic device (for example, a mobile phone) which may connect to a wireless device (for example, a wireless speaker or headphones). The electronic device may store prior audio information (for example, volume level information, audio equalization information) of at least one prior connection between the electronic device and the wireless device. The electronic device may retrieve the stored prior audio information and receive current audio information from the wireless device based on a detection of a current or new connection between the electronic device and the wireless device. An audio setting of the wireless device may be based on the received audio information. The electronic device may further adjust the stored prior audio information based on the current audio information received from the wireless device. The electronic device may further transmit an audio stream (for example a musical tone or a song portion) to the wireless device based on the adjusted prior audio information.

In contrast to conventional approaches where manual adjustment of the audio information or settings may be performed with prior wireless devices, the disclosed electronic device and a method may automatically adjust the audio information and/or audio settings between the electronic device and the wireless device based on a previously stored audio information (and/or audio settings), and current audio information (and/or audio settings) of the wireless device. The electronic device may communicate with the wireless device to receive the current audio information (and/or audio settings) of the wireless device to detect whether the current audio information (and/or audio settings) of the wireless device may be same as the prior stored audio information (and/or audio settings). As per the detection, the electronic device may accordingly adjust the stored audio information (or setting) based on the communication (or handshake) of the current audio information with the wireless device, in case the current audio information (and/or audio settings) of the wireless device is different from the prior stored audio information (and/or audio settings) in the electronic device.

Thus, even if the audio information or audio settings (like volume level) of the wireless device have changed (say manually by a person or automatically by the wireless device), still the disclosed electronic device may be capable of identifying the change and accordingly adjust the prior stored audio information and/or audio settings based on the two-way communication or handshake between the electronic device and the wireless device. This automatic audio adjustment may enhance user experience of content reproduction with the same output (like volume level), as the user might have experienced at the time of prior connection between the wireless device and the electronic device.

FIG. 1 is a diagram that illustrates an exemplary network environment for audio adjustment control for wireless device, in accordance with an embodiment of the disclosure.

With reference to FIG. 1, there is shown a network environment 100. The network environment 100 includes an electronic device 102, an image capture device 104, a wireless device 106, and a server 108. The electronic device 102 may be communicatively coupled to the server 108, via a communication network 110. Further, as shown in FIG. 1, the electronic device 102 may be communicatively coupled with the wireless device 106, via a wireless communication medium 112. In an embodiment, the image capture device 104 may be communicatively coupled with the electronic device 102 or the wireless device 106, via the communication network 110 as shown in FIG. 1. However, in some embodiments, the image capture device 104 may be integrated within the electronic device 102 or the wireless device 106, without a deviation in the scope of the disclosure. There is further shown a user 114 who may be associated with the electronic device 102 and the wireless device 106.

The electronic device 102 may include suitable logic, circuitry, interfaces, and/or code that may be configured to detect a new wireless connection (i.e. different from at least one prior connection) between the electronic device 102 and the wireless device 106. The electronic device 102 may be further configured to receive audio information from the wireless device 106 and adjust stored audio information (i.e. related to prior connection) based on the received audio information from the wireless device 106. The electronic device 102 may be further configured to transmit an audio stream (for example a musical tone) to the wireless device 106 based on the adjusted audio information. Examples of the electronic device 102 may include, but are not limited to, a computing device, a smartphone, smart glasses or smart audio glasses, a cellular phone, a mobile phone, a gaming device, a television, a mainframe machine, a server, a computer work-station, a media controller, a music controller, an infotainment system, and/or a consumer electronic (CE) device that have the capability to wirelessly pair with other device(s).

The image capture device 104 may include suitable logic, circuitry, and interfaces that may be configured to capture one or more images of surrounding of the electronic device 102. The image capture device 104 may be further configured to determine a number of sound sources (for example people or sound generating devices) present close to the wireless device 106 which may be wirelessly connected with the electronic device 102. Examples of the image capture device 104 may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices.

The wireless device 106 may include suitable logic, circuitry, interfaces, and/or code that may be configured to playback an audio output of the audio stream received from the electronic device 102. The wireless device 106 may be configured to receive the audio stream in the form of electrical audio signals from the electronic device 102 and convert the received electrical audio signals into the audio/sound output. Examples of the wireless device 106 may include, but are not limited to, a wireless earphone, a wireless headphone, a wireless augmented reality (AR)/virtual reality (VR) device, a wireless loudspeaker, a wireless woofer, a wireless sub-woofer, a wireless tweeter, a wireless speaker, a monitor speaker, or other speakers or sound output device.

The server 108 may include suitable logic, circuitry, interfaces, and/or code that may be configured to store media content that may include the audio stream accessed by the electronic device 102. The server 108 may be configured to receive a media content request from the electronic device 102 to retrieve the media content from the server 108. In some embodiments, the server 108 may be further configured to store first audio information and adjusted first audio information. The server 108 may be implemented as a cloud server and may execute operations through web applications, cloud applications, HTTP requests, repository operations, file transfer, and the like. Other example implementations of the server 108 may include, but are not limited to, a database server, a file server, a web server, a media server, an application server, a mainframe server, or a cloud computing server.

In at least one embodiment, the server 108 may be implemented as a plurality of distributed cloud-based resources by use of several technologies that are well known to those ordinarily skilled in the art. A person with ordinary skill in the art will understand that the scope of the disclosure may not be limited to the implementation of the server 108 and the electronic device 102 as two separate entities. In certain embodiments, the functionalities of the server 108 can be incorporated in its entirety or at least partially in the electronic device 102, without a departure from the scope of the disclosure.

The communication network 110 may include a communication medium through which the electronic device 102, the image capture device 104, the wireless device 106, and the server 108 may communicate with each other. The communication network 110 may be a wired or wireless communication network. Examples of the communication network 110 may include, but are not limited to, Internet, a Wireless Fidelity (Wi-Fi) network, a Personal Area Network (PAN), a Local Area Network (LAN), or a Metropolitan Area Network (MAN).

Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The wireless communication medium 112 may include a wireless communication channel through which the electronic device 102 and the wireless device 106 may communicate with each other, wirelessly. Examples of the wireless communication medium 112 may include, but are not limited to, short range wireless communication channels, such as a Wireless Fidelity (Wi-Fi) network, a near field communication (NFC) channel, and a Bluetooth® (BT) communication network. Various entities in the network environment 100, such as the electronic device 102 and the wireless device 106 may be configured to connect to the wireless communication medium 120, in accordance with various wireless communication protocols. Examples of such wireless communication protocols may include, but are not limited to, at least one of wireless device-to-device communication protocols, Bluetooth® communication protocols, and ZigBee® protocols.

In operation, the electronic device 102 may initiate or establish a connection with the wireless device 106 based on communication protocols (such as wireless communication protocols). The established connection between the electronic device 102 and the wireless device 106 may be referred herein after as a new connection. The electronic device 102 may store first audio information and connection information that may be indicative of at least one prior connection between the electronic device 102 and the wireless device 106. The prior connection may refer to a last wireless connection established between the electronic device 102 and the wireless device 106. An audio communication (for example audio stream transfer) through the prior connection between the electronic device 102 and the wireless device 106 may be based on the first audio information. The first audio information may include, but is not limited to, volume level information, audio equalization information, or channel control information of the audio stream to be transmitted to the wireless device 106. The first audio information and the prior connection are further described, for example, in FIG. 3.

The electronic device 102 may be further configured to receive second audio information from the wireless device 106 based on the establishment of the new connection. The second audio information may include, but is not limited to, volume level information, audio equalization information, or channel control information stored in the wireless device 106. The received second audio information of the wireless device 106 may be different from the stored first audio information. An audio setting (for example volume setting) of the wireless device 106 may be based on the received second audio information. The electronic device 102 may be further configured to adjust the stored first audio information for the new connection based on the second audio information received from the wireless device. The details of the second audio information and adjustment of the stored first audio information are described, for example, in FIG. 3.

For example, the electronic device 102 may determine a first volume level indicated by the stored first audio information and a second volume level indicated by the received second audio information. The electronic device 102 may further compare the first volume level and the second volume level. In an embodiment, the first volume level may be higher than the second volume level. In such scenario, the electronic device 102 may increase the first volume level as the adjustment to the stored first audio information. In another embodiment, the first volume level may be lower than the second volume level. In such scenario, the electronic device 102 may decrease the first volume level as the adjustment to the stored first audio information. The electronic device 102 may further transmit an audio stream to the wireless device 106 based on the adjusted first audio information. The audio stream may be stored in the electronic device 102 or may be received from the server 108. In this regard, the electronic device 102 may adjust the stored first audio information (i.e. based on which the prior audio communication with the wireless device happened), according to the second audio information which may be currently set (or changed after the prior communication by the user 114) at the wireless device 106. Hence, the user experience for the playback of the audio stream may remain same as the prior communication between the electronic device 102 (for example mobile phone) and the wireless device 106 (for example wireless headphones), even if the audio information or audio setting at the end of the wireless device 106 changes (for example manually).

Modifications, additions, or omissions may be made to FIG. 1 without departing from the scope of the present disclosure. For example, the network environment 100 may include more or fewer elements than those illustrated and described in the present disclosure. In some embodiments, the network environment 100 may include the electronic device 102 but not the image capture device 104.

Figure 2:
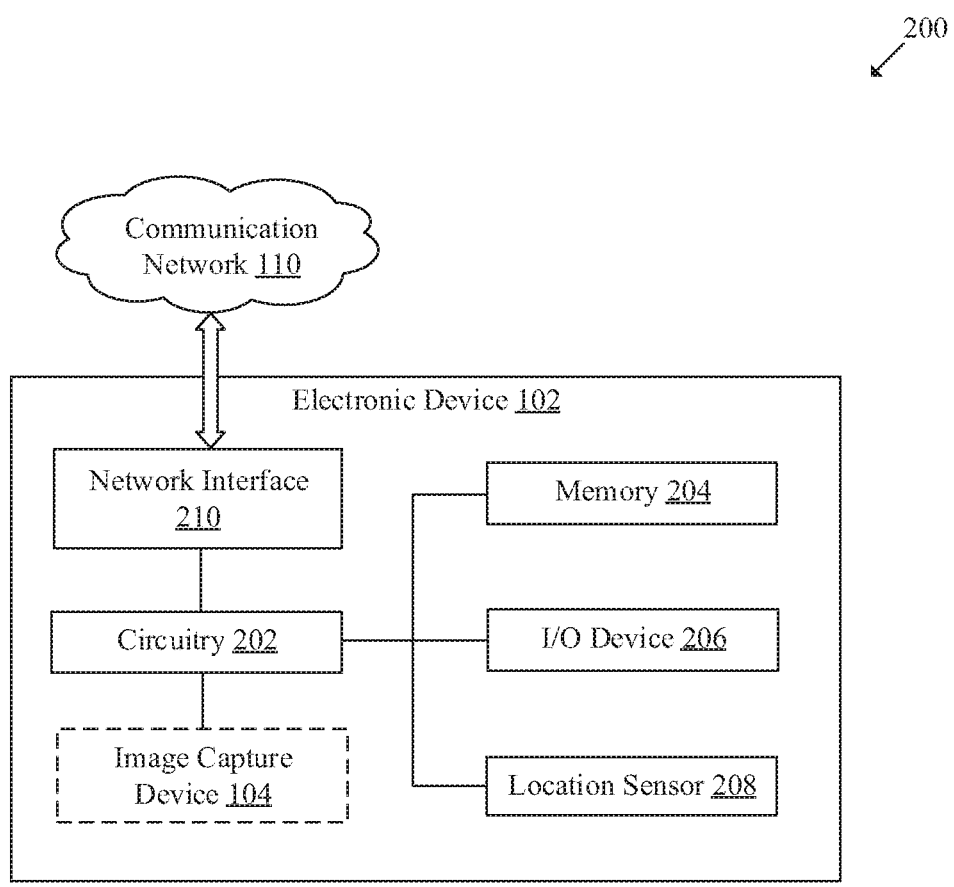
FIG. 2 is a block diagram that illustrates an exemplary electronic device for audio adjustment control for a wireless device, in accordance with an embodiment of the disclosure.

FIG. 2 is a block diagram that illustrates an exemplary electronic device for audio adjustment control for wireless device, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, a location sensor 208, and a network interface 210. In at least one embodiment, the electronic device 102 may also include the image capture device 104. The circuitry 202 may be communicatively coupled to the memory 204, the I/O device 206, the location sensor 208, the network interface 210, and the image capture device 104 through wired or wireless communication of the electronic device 102.

The circuitry 202 may include suitable logic, circuitry, and interfaces that may be configured to execute program instructions associated with different operations to be executed by the electronic device 102. The operations may include, for example, storage of the first audio information, reception of the second audio information from the wireless device 106, and adjustment of the first audio information for the wireless device 106. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, interfaces, and/or code that may be configured to store the program instructions to be executed by the circuitry 202. In at least one embodiment, the memory 204 may store the first audio information and the connection information indicative of the at least one prior connection between the electronic device 102 and the wireless device 106. The memory 204 may also store the adjusted first audio information. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive user input from the user 114 to initiate a playback of the media content (including audio stream). In response to the user input, the electronic device 102 may establish a new connection with the wireless device 106 and output or transmit the audio stream to the wireless device 106 for playback. The I/O device 206 which includes various input and output devices, may be configured to communicate with the circuitry 202. Examples of the I/O device 206 may include, but are not limited to, a touch screen, a keyboard, a mouse, a joystick, a microphone, a display device, and a speaker.

The location sensor 208 may include suitable logic, circuitry, and/or interfaces that may be configured to determine a geo-location of the electronic device 102. In some embodiments, the geo-location of the wireless device 106 may also be determined by the location sensor 208. Examples of the location sensor 208, may include, but are not limited to, a Global Navigation Satellite System (GNSS)-based sensor. Examples of the GNSS-based sensor may include, but are not limited to, global positioning sensor (GPS), Global Navigation Satellite System (GLONASS), or other regional navigation systems or sensors.

The network interface 210 may include suitable logic, circuitry, and interfaces that may be configured to facilitate a communication between the circuitry 202 and the server 108, via the communication network 110. The network interface 210 may be further configured to facilitate a communication between the circuitry 202 and the wireless device 106 via the wireless communication medium 112. The network interface 210 may be implemented by use of various known technologies to support wired or wireless communication of the electronic device 102 with the communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 210 may be configured to communicate via wireless communication with networks, such as the Internet, an Intranet or a wireless network, such as a cellular telephone network, a wireless local area network (LAN), a short range communication network, and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, and a wireless pear-to-pear protocol.

The functions or operations executed by the electronic device 102, as described in FIG. 1, may be performed by the circuitry 202. Operations executed by the circuitry 202 are described in detail, for example, in FIGS. 3, 4, and 5.

Figure 3:
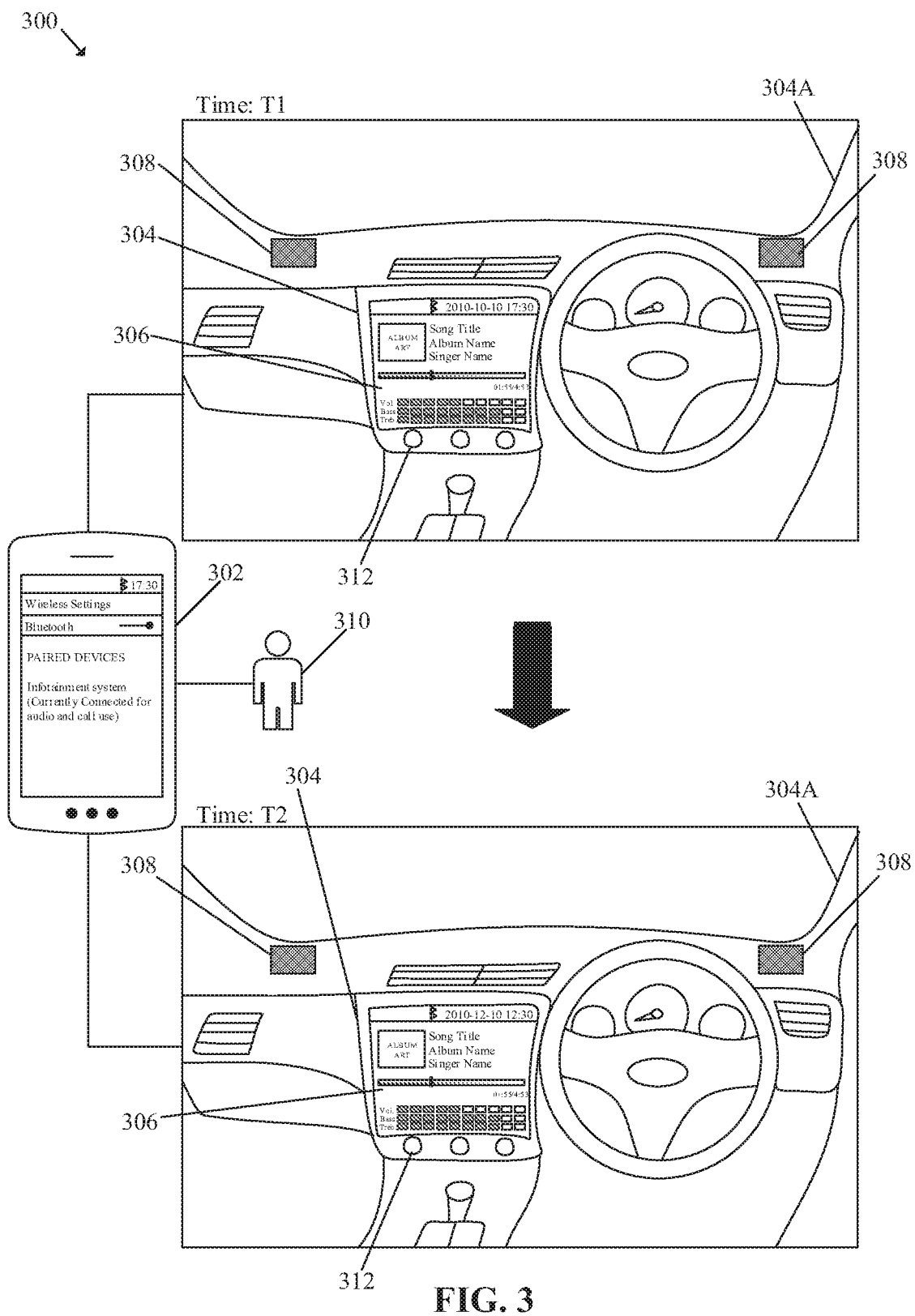
FIG. 3 is a diagram that illustrates a first exemplary scenario for audio adjustment control for a wireless device by the electronic device of FIG. 2, in accordance with an embodiment of the disclosure.

FIG. 3 is a diagram that illustrates a first exemplary scenario for audio adjustment control for a wireless device by the electronic device of FIG. 2, in accordance with an embodiment of the disclosure. FIG. 3 is explained in conjunction with elements from FIG. 1 and FIG. 2. With reference to FIG. 3, there is shown exemplary scenario 300. In the exemplary scenario 300, there is shown an electronic device 302 (for example a mobile phone). The functionalities of the electronic device 302 may be similar to the electronic device 102 of FIG. 1 or FIG. 2. There is further shown a wireless device 304 (for example an infotainment system of a vehicle 304A). The functionalities of the wireless device 304 may be the same as an exemplary implementation of the wireless device 106 of FIG. 1. The wireless device 304 may further include a display screen 306 and a speaker 308. In some embodiment, the wireless device 304 may be communicably coupled with the speaker 308 which may be located at a particular location inside the vehicle 304A as shown in FIG. 3. The wireless device 304 may control the display screen 306 to display visual content, and may control the speaker 308 to playback audio content (for example either received from the electronic device 302 or stored internally).

It may be noted that the mobile phone shown in FIG. 3 is presented merely as an example of the electronic device 102. The present disclosure may be also applicable to other types of the electronic device 102 such as a laptop, a TV, a gaming console, and other examples of the electronic device 102. It may be further noted that the vehicle infotainment system shown in FIG. 3 is presented merely as an example of the wireless device 106. The present disclosure may be also applicable to other types of the wireless device 106 such as a wireless headset, a wireless sub-woofer or speaker, and other examples of the wireless device 106.

As shown in FIG. 3, for example at time T1, the electronic device 302 may establish a connection with the wireless device 304 for a first time and may be herein referred as a first connection. The first connection may be established between the electronic device 302 and the wireless device 304 through the wireless communication medium 112 shown in FIG. 1. In an embodiment, the circuitry 202 of the electronic device 302 may be configured to receive a user input from a user 310 who may be associated with the electronic device 302. The user 310 may a person who own the electronic device 302 (or the wireless device 304) or may operate the electronic device 302 or the wireless device 304 in the vehicle 304A. The user input may indicate the electronic device 302 to establish a wireless connection, via the wireless communication medium 112, with the wireless device 304 and further indicate the electronic device 302 to transmit a particular audio stream to the wireless device 304 for playback.

In an embodiment, the first connection between the electronic device 302 and the wireless device 304 may be considered as a reference connection for adjustment of audio information for all the future connections between the electronic device 302 and the wireless device 304. Based on the established first connection, the circuitry 202 of the electronic device 302 may be further configured to receive another user input from the user 310. The other user input may correspond to an audio setting for the wireless device 304 based on which the wireless device 304 may playback the audio content (including an audio stream) received from the electronic device 302. The wireless device 304 may playback the received audio stream via the speaker 308. For example, the other user input may include a volume level (like 70% of maximum volume) at which the wireless device 304 may playback the audio content received from the electronic device 302, via the wireless communication medium 112.

In an embodiment, the circuitry 202 of the electronic device 302 may be further configured to determine first audio information based on the received other user input, where the other user input may correspond to the audio settings (for example a volume level) based on which the wireless device 304 may playback the audio content. Examples of the first audio information may include, but are not limited to, volume level information, audio equalization information, or channel control information for the wireless device 304. The volume level information may indicate the volume level (such as 70% volume) at which the wireless device 304 may playback the audio content received from the electronic device 302. In some embodiments, the volume level information may correspond the volume level of the electronic device 302 at which the electronic device 302 may transmit the audio content to the wireless device 304 for playback for the user 310.

The audio equalization information may indicate amplitude values (in dB) for particular frequency ranges (such as high frequency, mid frequency or low frequency) based on which the audio content may be equalized or adjusted, and may be further transmitted to the wireless device 304 for playback. For example, the audio equalization information may indicate amplitude values corresponding to bass and/or treble frequencies. The channel control information may indicate channel configuration information about the wireless device 304. By way of an example, in case there may be two speakers that may be controlled by the wireless device 304 to render the audio stream. Thus, the channel configuration information of the wireless device 304 may have a value of 2:1. In another example, in case there may be five speakers to be controlled by the wireless device 304, then the channel configuration information of the wireless device 304 may be 5:1.

In some embodiments, the first audio information may include the volume level information, the audio equalization information, or the channel control information for the electronic device 302. In some embodiments, the first audio information may be stored in the memory 204 of the electronic device 302. The circuitry 202 of the electronic device 302 may be configured to process the audio content (or audio stream) based on the stored first audio information, before the transmission of the audio stream to the wireless device 304 for playback. For example, the circuitry 202 of the electronic device 302 may set a volume of the audio stream to 70% as indicated by the stored volume level information in the first audio information. In another example, the circuitry 202 of the electronic device 302 may process the audio content to be divided into two channels (i.e. left or right) based on the stored channel control information in the first audio information, and may further transmit the audio content (i.e. divided in two channels) to the wireless device 304 for playback, as per stored setting (i.e. first audio information) in the memory 204 of the electronic device 302. In some embodiments, the circuitry 202 of the electronic device 302 may be configured to store the first audio information on the server 108.

In accordance with an embodiment, the circuitry 202 of the electronic device 302 may be further configured to store connection information along with the first audio information in the memory 204. The connection information may indicate information about the established connection (i.e. first connection) between the electronic device 302 and the wireless device 304, via the wireless communication medium 112 (shown in FIG. 1). By way of example, the connection information may include, but is not limited to, a timestamp of the first connection, a name of the wireless device 304, and identification information (like profile name) of the user 310 associated with the electronic device 302. In some embodiments, the electronic device 302 may wirelessly connect with more than one wireless devices (such as the wireless device 106). In such a scenario, the circuitry 202 of the electronic device 302 may store the first audio information for each connected wireless device 106 with an identifier (such as MAC address) of the corresponding wireless device, where the identifier of each wireless device may be unique.

Example of the connection information and the first audio information stored by the electronic device 302 is presented in Table 1, as follows:

TABLE 1

First Audio Information stored in the electronic device

| Stored Information | Exemplary Parameters | Exemplary Values |
|---|---|---|
| Connection Information | Timestamp | Date-Time (i.e. YYYY-MM-DD, HH:MM) |
| Connection Information | User Profile | ABC |
| Connection Information | Receiver (i.e. Wireless device) Name | Vehicle Infotainment System |
| Connection Information | Receiver MAC Address | AA:BB:CC:DD:EE:FF |
| First audio information | Receiver Volume | 80% (or in dB) |
| First audio information | Receiver Bass | 80% |
| First audio information | Receiver Treble | 80% |
| First audio information | Receiver channel Configuration | 2:1 |
| First audio information | Electronic Device Volume | 80% |
| First audio information | Electronic Device Bass | 80% |
| First audio information | Electronic Device Treble | 80% |

The N number of rows of the connection information and the first audio information, and related exemplary values shown in Table 1 is presented merely as an example. The Table 1 may include only one or more than N rows and other exemplary values, without deviation from the scope of the disclosure.

The electronic device 302 may store information included in Table 1 to indicate the prior connection between the electronic device 302 and the wireless device 304. The circuitry 202 may be configured perform the audio communication (i.e. transmission of the audio stream during the first/prior connection) with the wireless device 304 based on the first audio information stored in the Table 1. The circuitry 202 may be further configured to control the memory 204 to store the connection information and the first audio information for all future connections with the same wireless device 304. In other words, the disclosed electronic device 302 may remember the connection information and the first audio information (i.e. based on which the transmission or communication of the audio stream happened during the first connection) for future communications between the electronic device 302 and the wireless device 304. Thus, whenever the electronic device 302 may establish connection or communicate with the same wireless device 304 again, the circuitry 202 may automatically retrieve the stored or remembered first audio information (i.e. audio setting like volume level of last connection) from the memory 204 and configure the audio settings of the electronic device 302 or the wireless device 304 based on the retrieved first audio information (for example last volume level). The electronic device 302 may further control the transmission and playback of the audio stream based on the configured audio settings. This automatic configuration based on last audio information or setting may reduce manual effort of the user 310 to control/configure the audio settings (like volume level again) which may further enhance user experience.

In accordance with an embodiment, as shown in FIG. 3, at time T2 (different from T1), the electronic device 302 may again connect with the same wireless device 304 (such as infotainment system of the vehicle 304A). This connection may be herein referred to as a new connection between the electronic device 302 and the wireless device 304. The circuitry 202 of the electronic device 302 may be configured to detect the new connection (for example current connection) between the electronic device 302 and the wireless device 304. The new connection may be different from the first connection (i.e. prior connection) and may be established after the first connection at different date or time (i.e. T2) in comparison to the prior connection (i.e. last connection established at T1). The new connection may be established with the wireless device 304 to playback audio content stored in the memory 204 of the electronic device 302.

In accordance with an embodiment, the circuitry 202 may be further configured to transmit a request to the wireless device 304 for second audio information stored in the wireless device 304. The second audio information may include at least one of volume level information, audio equalization information, or channel control information of the wireless device 304. An audio setting (for examples, volume, equalization, channel information) of the wireless device 304 may be configured in the wireless device 304 based on the second audio information to playback the audio content. The circuitry 202 of the electronic device 302 may request the second audio information from the wireless device 304 to verify whether the audio settings (or the second audio information) of the wireless device 304 has changed (say manually by the user 310 or other users of the vehicle 304A, like kids) or not, after the prior connection. For example, after the disconnection of the prior connection at time T1, the user 310 may have operated a volume button 312 of the wireless device 304 (e.g. infotainment system) to change the audio setting of the wireless device 304 to further change the second audio information. The changed audio setting (i.e. second audio information) may be different from the first audio information which was stored or remembered by the electronic device 302 during the prior connection (say at T1) to playback the audio content. For example, the user 310 or other user (such as an occupant of the vehicle 304A) of the wireless device 304 may have manually changed the volume level of the wireless device 304 using the volume button 312 after the prior connection (i.e. established at time T1). Due to such change in the volume level, the audio setting or the second audio information of the wireless device 304 may change.

The circuitry 202 of the electronic device 302 may be further configured to receive the second audio information from the wireless device 304 based on the transmitted request. The circuitry 202 of the electronic device 302 may be further configured to compare the received second audio information and the stored first audio information to identify the change in the audio setting at the wireless device 304. In an embodiment, the received second audio information may be same as the stored first audio information, in case the user 310 has not manually changed the audio setting (i.e. volume, equalization, or channel control) at the wireless device 304. In such instance, the circuitry 202 of the electronic device 302 may transmit the audio stream, of particular audio content to be played, to the wireless device 304 without adjustment of the first audio information (or the audio setting). The wireless device 304 may further render or playback the audio stream received from the electronic device 302 based on the stored first audio information which was stored or remembered by the electronic device 302 during the prior connection with the wireless device 304.

In another embodiment, the volume level of the wireless device 304 may have changed between the time T1 (i.e. prior connection) and the time T2 (i.e. new or current connection). In such instance, the received second audio information may be different from the stored first audio information. The circuitry 202 of the electronic device 302 may be further configured to adjust the stored first audio information based on the second audio information received from the wireless device 304. The adjustment of the stored first audio information may include, but is not limited to, change in the volume level information, the audio equalization information, or the channel control information.

By way of example, the circuitry 202 of the electronic device 302 may determine a first volume level indicated by the stored first audio information and a second volume level information indicated by the received second audio information of the wireless device 304. The circuitry 202 may be configured to determine whether the first volume level indicated by the first audio information is higher or lower than the second volume level indicated by the second audio information. In case, the determined first volume level (for example 70%) indicted by the stored first audio information is higher than the second volume level (for example 50%) indicated by the second audio information, the circuitry 202 may increase the first volume level as the adjustment of the first audio information. The adjustment or increase in the volume level may be required because the reduced volume level of 50% (i.e. second audio information) at the wireless device 304 may not be sufficient enough to reproduce same playback effect as reproduced during the prior connection using the stored first volume level (i.e. 70%), which may further affect the user experience. Therefore, based on the received information about the second volume level (for example 50%), the circuitry 202 may increase or adjust the first volume level (say from 70% to 90%) of the audio stream and transmit the audio stream (i.e. with adjusted volume level) to the wireless device 304 such that the user 310 may have same playback experience which the user 310 had last time at the time T1 (i.e. last connection). Such similar playback experience for the user 310 may be based on convolution of the stored first audio information and the received second audio information performed by the disclosed electronic device 302. Such convolution of two audio levels may be based on a handshake or a two-level communication (i.e. during which the audio information may be shared) between the electronic device 302 and the wireless device 304. The handshake or two-level communication may be done between the electronic device 302 and the wireless device 304 automatically before the transmission of the audio stream to the wireless device 304.

In another case, the determined first volume level (for example 70%) indicted by the stored first audio information may be lower than the second volume level (for example 80%) indicated by the received second audio information of the wireless device 304. In such instance, the circuitry 202 of the electronic device 302 may decrease the first volume level as the adjustment to the first audio information. The adjustment or decrease in the volume level may be required because the increased volume level of 80% (i.e. second audio information) at the wireless device 304 may render high volume sound at the wireless device 304 which may not be desired by the user 310, as set in the stored first audio information during the prior connection (time T1). Therefore, based on the received information about the second volume level (for example 80%), the circuitry 202 may decrease or adjust the first volume level (say from 70% to 60%) of the audio stream and transmit the audio stream (i.e. with adjusted volume level) to the wireless device 304 such that the user 310 may have same playback experience which the user 310 had last time at the time T1 (i.e. last connection). Such similar playback experience for the user 310 may be based on convolution of the stored first audio information and the received second audio information performed by the disclosed electronic device 302.

In another embodiment, the electronic device 302 or the wireless device 304 may be utilized by multiple users (including the user 310), and each user may have a corresponding user profile associated with either of the electronic device 302 or the wireless device 304. The user profile of each user may be stored in the memory 204 of the electronic device 302. Each of the users may have a corresponding stored first audio information and/or audio setting that may or may not differ from the stored first audio information of other users. The audio information/audio settings of each user may be stored in their corresponding user profile, which is stored in the memory 204. In case of multiple user profiles, the circuitry 202 of the electronic device 302 may be configured to determine user profile information that may identify a first user (such as the user 310) associated with either of the electronic device 302 or the wireless device 304. The circuitry 202 may further determine the audio information and/or audio settings from the corresponding user profile of the first user and adjust the first audio information and/or audio settings based on the determined user profile information and the received second audio information. For example, the user profile information may indicate a hearing impairment problem that the user may have. In such instance, the circuitry 202 may adjust the stored first audio information based on the type of hearing impairment associated with the user profile information.

By way of example and not limitation, there may be three users (user A, user B, and user C) associated with the electronic device 302. A first volume level associated with a first user "A" may be 70% and may be stored in first user profile information. A second volume level associated with a second user may be 100% and may be stored in second user profile information. A third user may have a particular type of hearing impairment and related information may be stored in third user profile information associated with the third user. The third user profile information may include a third volume level (for example 50%) and a particular frequency for the hearing impairment. At the time of new connection (time T2), the circuitry 202 of the electronic device 302 may be configured to determine the user associated with the electronic device 302 or the wireless device 304. In case, the determined user is the first user, the circuitry 202 may adjust the volume level to 70%. In case, the determined user is the second user, the circuitry 202 may adjust the volume level to 100%. In case, the determined user is the third user, the circuitry 202 may adjust the volume level to 50% and equalize the audio based on the particular frequency for the hearing impairment of the third user. Hence, the disclosed electronic device 302 may adapt according to preferences of the user who may currently associated with the electronic device 302 or with the wireless device 304.

The circuitry 202 of the electronic device 302 may be further configured to transmit the audio stream to the wireless device 304 based on the adjusted first audio information. The wireless device 304 may further render or playback the received audio stream via the speaker 308 based on the adjusted first audio information. In an embodiment, the circuitry 202 may be further configured to control the memory 204 to re-store the adjusted first audio information in the memory 204. The circuitry 202 may further update the stored connection information with information about the new connection between the electronic device 302 and the wireless device 304. For example, the circuitry 202 of the electronic device 302 may update the timestamp (i.e. related to time T2) in the connection information to consider the established new connection (at T2) as the prior or last connection for all future connections between the electronic device 302 and the wireless device 304. Thus, the disclosed electronic device 302 may restore the adjusted audio information which may be considered as a reference or remembered audio information for the automatic audio adjustments during next or future connection(s) between the electronic device 302 and the wireless device 304.

Figure 4:
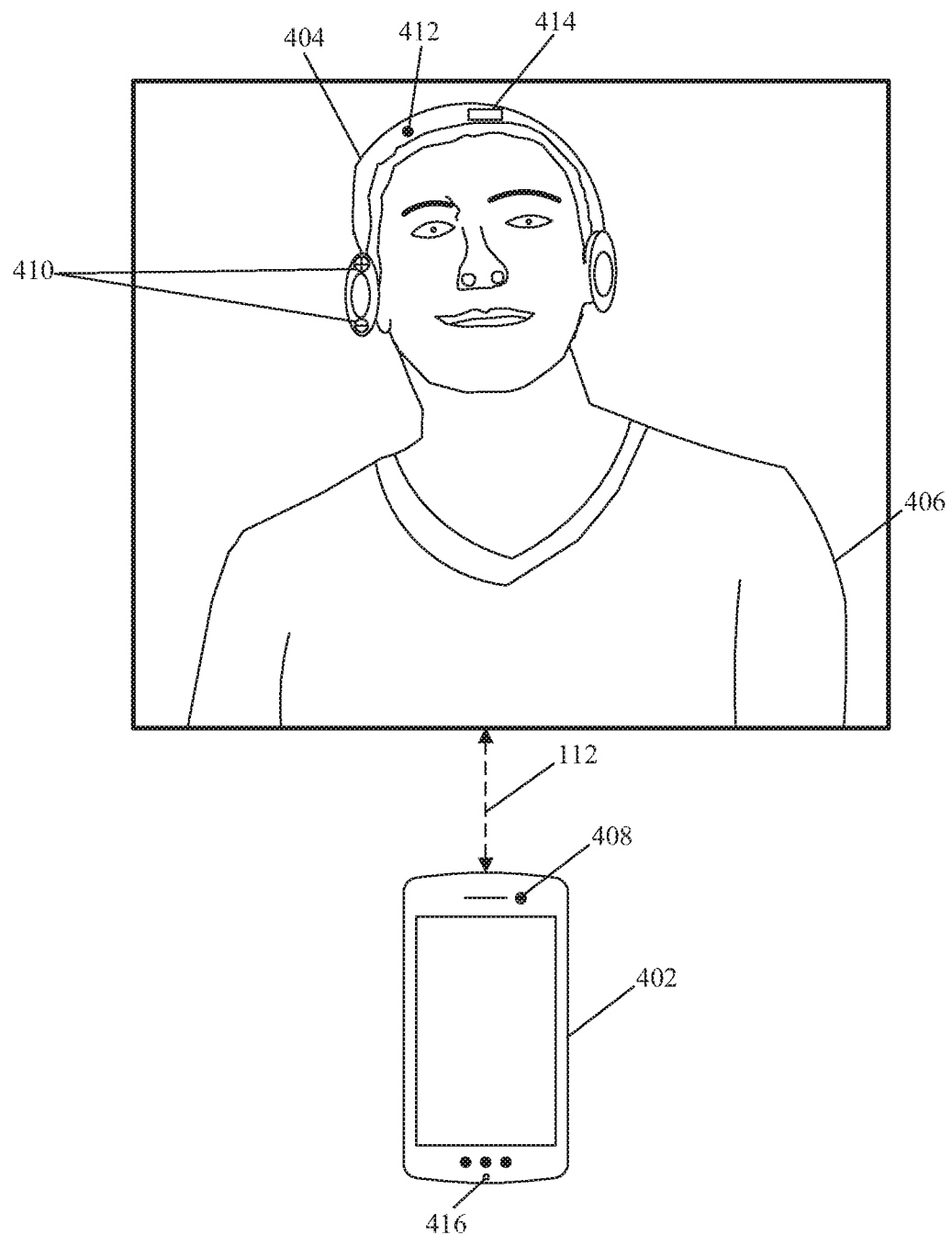
FIG. 4 is a diagram that illustrates a second exemplary scenario for audio adjustment control for wireless device by the electronic device of FIG. 2, in accordance with an embodiment of the disclosure.

FIG. 4 is a diagram that illustrates a second exemplary scenario for audio adjustment control for wireless device by the electronic device of FIG. 2, in accordance with an embodiment of the disclosure. FIG. 4 is explained in conjunction with elements from FIG. 1, FIG. 2 and FIG. 3. With reference to FIG. 4, there is shown exemplary scenario 400. In the exemplary scenario 400, there is shown an electronic device 402 (such a mobile phone). The functionalities of the electronic device 402 may be similar to the functionalities of the electronic device 102 of FIG. 1 or the electronic device 302 of FIG. 3. There is further shown a wireless device 404 (such as a wireless headphone or headset). The functionalities of the wireless device 404 may be similar to the functionalities of the wireless device 106 of FIG. 1 or the wireless device 304 of FIG. 3. Although, certain functionalities of the wireless device 404 (such as wireless headphones) may be different from the wireless device 304 (such as infotainment system of vehicle) of FIG. 3. Description of such functionalities of the wireless headphones which may differ from the infotainment system has been omitted for the disclosure for the sake of brevity. Further, as per FIG. 4, the electronic device 402 and the wireless device 404 may be associated with a user 406. For example, the wireless device 404 may be worn by the user 406 to listen the audio content provided by the electronic device 402.

It may be noted that the mobile phone shown in FIG. 4 is presented merely as an example of the electronic device 102. The present disclosure may be also applicable to other types of the electronic device 102 such as a laptop, a TV, a gaming console, and other examples of the electronic device 102. It may be further noted that the wireless headphones/headset shown in FIG. 4 is presented merely as an example of the wireless device 106. The present disclosure may be also applicable to other types of the wireless device 106 such as a soundbar, a wireless sub-woofer or speaker, or other examples of the wireless device 106.

In accordance with an embodiment, the circuitry 202 of the electronic device 402 may store the first audio information and the connection information indicative of at least one prior connection between the electronic device 402 and the wireless device 404 as described in FIG. 3. An audio communication of the audio content, through the prior connection between the electronic device 402 and the wireless device 404, may be based on the first audio information stored or remembered by the electronic device 402.

The circuitry 202 of the electronic device 402 may be configured to detect a new connection (i.e. at time T2) between the electronic device 402 and the wireless device 404. The new connection may be different from the prior connection (at time T1) between the electronic device 402 and the wireless device 404. The circuitry 202 may be further configured to receive second audio information from the wireless device 404 based on the new connection. The second audio information may be different from the stored first audio information, and current audio setting of the wireless device 404 may be configured based on the second audio information. In an embodiment, the circuitry 202 of the electronic device 402 may request the second audio information from the wireless device 404 to verify whether the audio settings (or the second audio information) of the wireless device 404 has changed manually (say by the user 406 or other users of the wireless device 404) or not, after the prior connection. For example, after the disconnection of the prior connection at time T1, the user 406 may have operated a volume button 410 of the wireless device 404 (e.g. wireless headphones) to change the audio setting (like volume level) of the wireless device 404, where the changed audio setting (i.e. second audio information) may be different from the first audio information which was stored or remembered by the electronic device 402 during the prior connection (say at T1) to playback the audio content. In accordance with an embodiment, the circuitry 202 of the electronic device 402 may be further configured to adjust the stored first audio information based on the second audio information received from the wireless device 404. The details of the adjustment of the first audio information are described in detail, for example, in FIG. 3. Hence, even if the user 406 had manually changed the second audio information of the wireless device 404, using the volume button 410, the disclosed electronic device 402 may communicate or handshake with the wireless device 404 to receive the current second audio information, and may be able to accordingly adjust the stored first audio information to maintain or enhance the user experience with the wireless device 404 similar to the user 406 had during the prior connection.

In an embodiment, the wireless device 404 may include a location sensor 412 which may be embedded in or located on a surface of the wireless device 404. The circuitry 202 may be configured to determine a first geo-location of the wireless device 404 in real time or near real time, using the location sensor 412. The circuitry 202 may be further configured to adjust the stored first audio information based on the detected first geo-location and the second audio information received from the wireless device 404. The circuitry 202 of the electronic device 402 may further transmit the audio stream to the wireless device 404 based on the adjusted first audio information.

By way of example, and not limitation, the circuitry 202 of the electronic device 402 may determine the first geo-location of the wireless device 404 and a current timestamp of determination of the first geo-location. The circuitry 202 of the electronic device 402 may determine that the first geo-location of the wireless device 404 may be similar to a geo-location of an office of the user 406. The geo-location of the office of the user 406 may be stored and retrieved from the stored user profile information of the user 406. The circuitry 202 may further determine the current timestamp (for example using a real-time clock, not shown) and predict that the user 406 may be in the office based on the current timestamp and the detected first geo-location of the wireless device 404. In such scenario, for example, the circuitry 202 may decrease the first volume level, as the adjustment to the first audio information, based on the prediction that the user 406 is in the office, such that the reduced volume level may not disturb or distract other people present in the office. In some embodiments, the user profile information of the user 406 may include a volume threshold (such as 10% volume) for a particular geo-location (like the office). The circuitry 202 may be configured to decrease the first volume level, as the adjustment to the first audio information, based on the stored volume threshold, so that the decreased first volume level may be set equal or lower than the stored volume threshold. By the way of another example, the location sensor 412 may detect the current location as a market (or any other crowded place). The circuitry 202 of the electronic device 402 may predict that the user may be in the market which may have high ambient noise. In such scenario, for example, the circuitry 202 of the electronic device 402 may increase the first volume level, as the adjustment to the first audio information, based on the prediction that the user 406 is in the market. The first volume level may be increased to cancel out the ambient noise such that the user 406 may listen to the reproduced sound effectively. Therefore, the disclosed electronic device 402 may be able to adjust the audio information based on the geo-location and hence may further enhance user experience with the wireless device 404 in real-time.

Additionally, or alternatively, electronic device 402 may include the location sensor 208 as shown in FIG. 2. It may be noted that the wireless device 404 may be within a threshold distance from the electronic device 402. For example, the electronic device 402 and the wireless device 404 (for example a wireless speaker or soundbar) may be located at different rooms (say more than 10 meters apart from each other) and may have different geo-locations. The circuitry 202 of the electronic device 402 may be configured to detect a second geo-location of the electronic device 402 using the location sensor 208, and may further adjust the stored first audio information based on the detected second geo-location and the second audio information received from the wireless device 404. The circuitry 202 of the electronic device 402 may be further configured to transmit the audio stream to the wireless device 404 for playback based on the adjusted first audio information.

In an embodiment, the wireless device 404 may be a battery powered headset which may include a battery 414 shown in FIG. 4. In such scenario, the circuitry 202 of the electronic device 402 may be configured to determine battery information associated with the battery 414 of the wireless device 404. In some embodiments, the circuitry 202 may receive the battery information about the battery 414 from the wireless device 404 based on the established new connection. The battery information may indicate a remaining battery percentage or power of the battery 414. The circuitry 202 may be further configured to adjust the stored first audio information based on the determined battery information of the wireless device 404. The circuitry 202 may be further configured to transmit the audio stream to the wireless device 404 for playback based on the adjusted first audio information.

By way of example, and not limitation, the circuitry 202 of the electronic device 402 may determine the battery information of the wireless device 404. The battery information may include, but is not limited to, remaining battery percentage of the battery 414, or a time interval since last charge of the battery 414. The circuitry 202 may be further configured to compare the determined battery percentage of the wireless device 404 with a battery percentage threshold stored in the memory 204. In some instances, the battery percentage of the wireless device 404 may be greater than or equal to the battery percentage threshold (for example 20%) which may indicate sufficient power to playback the adjusted audio stream. In such scenario, the circuitry 202 may adjust the stored first audio information based on the second audio information received from the wireless device 404. The circuitry 202 may increase or decrease the first volume level stored in the first audio information as the part of adjustment to save power. In some other instances, in case, the battery percentage of the wireless device 404 is lesser than or equal to the battery percentage threshold. In such scenario, the circuitry 202 may adjust the stored first audio information based on the second audio information received from the wireless device 404 and the battery percentage determined from the received battery information.

For example, in case the battery percentage of the wireless device 404 is lesser than or equal to the battery percentage threshold, the circuitry 202 may decrease the first volume level, as the adjustment to the first audio information, based on the determined battery percentage. The circuitry 202 of the electronic device 402 may further transmit the audio stream to the wireless device 404 based on the decreased first volume level. The electronic device 402 may decrease the first volume level so that the user 406 may be able to enjoy the audio stream for a longer duration of time before the battery gets completely discharged. Therefore, the disclosed electronic device 402 may provide enhanced control over the playback of the audio stream rendered by the wireless device 404 based on the battery information of the wireless device 404.

Additionally, or alternatively, the electronic device 402 (such as the mobile phone) may be a battery powered device which may include a battery (not shown). In such scenario, the circuitry 202 may determine the battery information associated with the battery of the electronic device 402. The circuitry 202 may be further configured to adjust the stored first audio information based on the determined battery information of the electronic device 402. The circuitry 202 of the electronic device 402 may further transmit the audio stream to the wireless device 404 based on the adjusted first audio information.

In accordance with an embodiment, the electronic device 402 may include an image capture device 408 which may be integrated/associated with the electronic device 402 as shown, as an example, in FIG. 4. The image capture device 408 may be similar to the image capture device 104 of FIG. 1. The circuitry 202 of the electronic device 402 may be configured to control the image capture device 408 to capture an image of the surrounding area of the electronic device 402. The surrounding area of the electronic device 402 may be covered in the field-of-view (FOV) of the image capture device 408. The circuitry 202 may be further configured to determine a number of sound sources close to the wireless device connected with the electronic device 402, via the wireless communication medium 112. The sound sources may correspond to animated or in-animated objects that may have the capability to output or produce audio or sound. Examples of the sound sources may include, but are not limited to, humans, loud-speakers, motors, televisions, or vehicles. The number of sound sources present close to the wireless device 404 may be determined by an application of various object detection algorithms (such as neural network-based object detectors) known in the prior art. In some embodiments, the circuitry 202 may determine ambient noise or sound produced by such sound sources using an inbuilt audio capturing device 416 (such as a microphone) in the electronic device 402. The inbuilt audio capturing device 416 may capture the ambient noise around the electronic device 402 or the wireless device 404. The circuitry 202 may be further configured to adjust the stored first audio information based on the determined number of sound sources or the determined ambient noise, or sound produced by such sound sources.

By way of example and not limitation, the user 406 may be present in a crowded location (for example in a cafeteria or a marriage event) and may connect the electronic device 402 with the wireless device 404 to playback the audio content. The circuitry 202 of the electronic device 402 may control the image capture device 408 capture the image of the crowded location and determine the number of sound sources close to the user 406 or the electronic device 402. The circuitry 202 may further determine the ambient noise (in decibels) based on the determined number of sound sources. In some other embodiments, the ambient noise (in decibels) may be captured by inbuilt audio capturing device 416 and may be transmitted to the circuitry 202 by the inbuilt audio capturing device 416. The ambient noise may affect the playback of the audio stream produced by the wireless device 404. The circuitry 202 may further determine whether the ambient noise is greater than a predefined noise threshold. In some embodiments, the determined ambient noise may be less than the predefined threshold. In such scenario, the circuitry 202 may transmit the audio stream to the wireless device 404 based on the first volume level stored in the first audio information. In some other embodiments, the determined ambient noise may be greater than or equal to the predefined threshold. In such scenario, the circuitry 202 may increase the first volume level, as the adjustment to the first audio information. The first volume level may be increased to suppress the ambient noise to certain extent and maintain or enhance the user experience for the playback of the audio stream. Thus, the disclosed electronic device 402 may be able to adjust the audio information based on the ambient noise or number of audio sources automatically and may enhance the user experience.

Additionally, or alternatively, the image capture device 408 may be integrated/associated with the wireless device 404. The circuitry 202 of the electronic device 402 may control the image capture device 408 to capture an image of the surrounding area of the wireless device 404. The circuitry 202 of the electronic device 402 may further adjust the stored first audio information based on the determined number of sound sources or ambient noise as described above.

Figure 5:
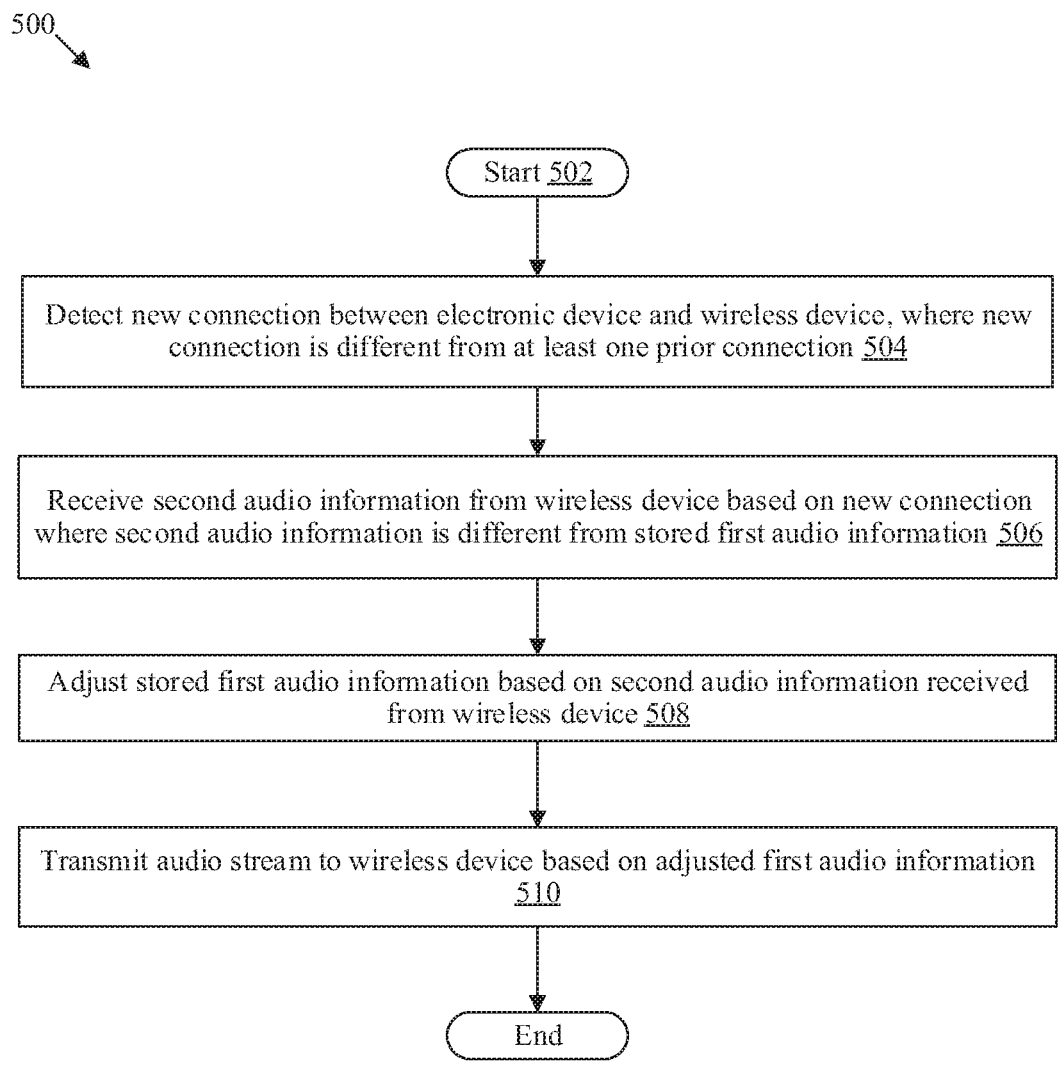
FIG. 5 is a flowchart that illustrates exemplary operations for audio adjustment control for a wireless device, in accordance with an embodiment of the disclosure.

FIG. 5 is a flowchart that illustrates exemplary operations for audio adjustment control for wireless device, in accordance with an embodiment of the disclosure. FIG. 5 is explained in conjunction with elements from FIGS. 1, 2, 3, and 4. With reference to FIG. 5, there is shown a flowchart 500. The operations from 502 to 510 may be implemented by any computing system, such as by the electronic device 102 of FIG. 1, electronic device 302 of FIG. 3, or the electronic device 402 of FIG. 4. The operations may start at 502 and may proceed to 504.

At 504, a new connection between the electronic device 102 and the wireless device 106 may be detected. The new connection may be different from the at least one prior connection between the electronic device 102 and the wireless device 106. In at least one embodiment, the circuitry 202 may be configured to detect the new connection (for example the current connection) between the electronic device 102 and the wireless device 106, where the new connection may be different from the at least one prior connection (for example the last connection) between the electronic device 102 and the wireless device 106. The prior connection may be based on first audio information stored in the electronic device 102, as described, for example, in FIG. 3.

At 506, second audio information may be received from the wireless device 106 based on the new connection. The second audio information may be different from the stored first audio information. In at least one embodiment, the circuitry 202 may be configured to receive the second audio information from the wireless device 106 based on the detected new connection, where the second audio information may be different from the stored first audio information. The details of the first audio information and the second audio information are described, for example, in FIGS. 3 and 4.

At 508, the stored first audio information may be adjusted based on the second audio information received from the wireless device 106. In at least one embodiment, the circuitry 202 may be configured to adjust the stored first audio information based on the second audio information received from the wireless device 106 as described, for example, in FIG. 3.

At 510, an audio stream may be transmitted to the wireless device 106 based on the adjusted first audio information. In at least one embodiment, the circuitry 202 may be configured to transmit the audio stream, related to the audio content, to the wireless device 106 based on the adjusted first audio information as described, for example, in FIG. 3. Control may pass to end.

Various embodiments of the disclosure may provide a non-transitory computer readable medium and/or storage medium having stored thereon, instructions executable by a machine and/or a computer to operate an electronic device (such as the electronic device 102). The instructions may cause the machine and/or computer to perform operations that include storage of first audio information and connection information indicative of at least one prior connection between an electronic device and a wireless device. An audio communication, through the at least one prior connection between the electronic device and the wireless device, may be based on the first audio information. The operations may further include detection of a new connection between the electronic device and the wireless device. The new connection between the electronic device and the wireless device may be different from at least one prior connection between the electronic device and the wireless device. The operations may further include reception of second audio information from the wireless device based on the new connection. The second audio information may be different from the stored first audio information and an audio setting of the wireless device may be configured based on the second audio information. The operations may further include adjustment of the stored first audio information based on the received second audio information received from the wireless device. The operations may further include transmission of an audio stream to the wireless device based on the adjusted first audio information.

Exemplary aspects of the disclosure may include an electronic device (such as the electronic device 102 of FIG. 1) that may include circuitry (such as the circuitry 202) that may be communicatively coupled to a wireless device (such as the wireless device 106 of FIG. 1), and may further include memory (such as the memory 204 of FIG. 2). The memory may be configured to store first audio information and connection information indicative of at least one prior connection between the electronic device and the wireless device. An audio communication through the at least one prior connection between the electronic device and the wireless device may be based on the first audio information. The circuitry may be configured to detect a new connection between the electronic device and the wireless device. The new connection may be different from the at least one prior connection between the electronic device and the wireless device. The circuitry may be further configured to receive second audio information from the wireless device based on the new connection. The second audio information may be different from the stored first audio information and an audio setting of the wireless device may be configured based on the second audio information. The first audio information and the second audio information may include at least one of volume level information, audio equalization information, or channel control information. The circuitry may be further configured to adjust the stored first audio information based on the second audio information received from the wireless device. The circuitry may be further configured to transmit an audio stream to the wireless device based on the adjusted first audio information.

In accordance with an embodiment, the circuitry may be configured to determine that a first volume level indicated by the first audio information is higher than a second volume level indicated by the second audio information received from the wireless device. The circuitry may be further configured to increase the first volume level as the adjustment to the first audio information. The first volume information may be increased based on the determination that the first volume level is higher than the second volume level. The circuitry may be further configured to transmit an audio stream to the wireless device based on the increased first volume level. The wireless device may render the audio stream based on the adjusted first audio information.

In accordance with an embodiment, the circuitry may be configured to detect a first geo-location of the wireless device and/or a second geo-location of the electronic device. The circuitry may be further configured to adjust the stored first audio information based on the detected first and/or second geo-location and the second audio information received from the wireless device. The circuitry may be further configured to transmit the audio stream to the wireless device based on the adjusted first audio information.

In accordance with an embodiment, the circuitry may be further configured to determine user profile information that may indicate a user associated with either of the electronic device or the wireless device connected with the electronic device. The circuitry may be further configured to adjust the stored first audio information based on the determined user profile information and transmit the audio stream to the wireless device based on the adjusted first audio information.

In accordance with an embodiment, the circuitry may be further configured to determine battery information associated with a battery of at least one of the electronic device or the wireless device. The circuitry may be further configured to adjust the stored first audio information based on the determined battery information. The circuitry may be further configured to transmit the audio stream to the wireless device based on the adjusted first audio information.

In accordance with an embodiment, the electronic device 102 may include an image capture device (such as the image capture device 104 of FIG. 1). The circuitry may be further configured to control the image capture device to determine a number of sound sources close to the wireless device connected with the electronic device. The circuitry may be further configured to adjust the stored first audio information based on the determined number of sound sources and transmit the audio stream to the wireless device based on the adjusted first audio information.

In accordance with an embodiment, the circuitry may be further configured to control the memory to re-store the adjusted first audio information. The circuitry may be further configured to update the connection information with information about the new connection between the electronic device and the wireless device.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
   a memory configured to store first audio information and connection information indicative of at least one prior connection between the electronic device and a wireless device, wherein an audio communication through the at least one prior connection between the electronic device and the wireless device is based on the stored first audio information; and
   circuitry, coupled with the memory, wherein the circuitry is configured to:
      detect a new connection between the electronic device and the wireless device, wherein the new connection is different from the at least one prior connection;
      receive second audio information from the wireless device based on the new connection, wherein
         the second audio information is different from the stored first audio information, and
         an audio setting of the wireless device is configured based on the second audio information;
      control an image capture device to determine a number of sound sources close to the wireless device connected with the electronic device;
      adjust the stored first audio information based on the second audio information received from the wireless device and the determined number of sound sources; and
      transmit an audio stream to the wireless device based on the adjusted first audio information.

2. The electronic device according to claim 1, wherein the wireless device renders the audio stream based on the adjusted first audio information.

3. The electronic device according to claim 1, wherein the first audio information and the second audio information comprise at least one of volume level information, audio equalization information, or channel control information.

4. The electronic device according to claim 1, wherein the circuitry is further configured to:
   determine that a first volume level indicated by the first audio information is higher than a second volume level indicated by the second audio information received from the wireless device;
   increase the first volume level, as the adjustment to the first audio information, based on the determination; and
   transmit the audio stream to the wireless device based on the increased first volume level.

5. The electronic device according to claim 1, wherein the circuitry is further configured to:
   control the memory to re-store the adjusted first audio information; and
   update the connection information with information about the new connection between the electronic device and the wireless device.

6. The electronic device according to claim 1, wherein the circuitry is further configured to:
   detect a first geo-location of the wireless device;
   adjust the stored first audio information based on the detected first geo-location and the second audio information received from the wireless device; and
   transmit the audio stream to the wireless device based on the adjusted first audio information.

7. The electronic device according to claim 1, wherein the circuitry is further configured to:
   detect a second geo-location of the electronic device;
   adjust the stored first audio information based on the detected second geo-location and the second audio information received from the wireless device; and
   transmit the audio stream to the wireless device based on the adjusted first audio information.

8. The electronic device according to claim 1, wherein the circuitry is further configured to:
   determine user profile information which indicates a user associated with one of the electronic device or the wireless device connected with the electronic device;
   adjust the stored first audio information based on the determined user profile information; and
   transmit the audio stream to the wireless device based on the adjusted first audio information.

9. The electronic device according to claim 1, wherein the circuitry is further configured to:
   determine battery information associated with a battery of at least one of the electronic device or the wireless device;
   adjust the stored first audio information based on the determined battery information; and
   transmit the audio stream to the wireless device based on the adjusted first audio information.

10. A method, comprising:
    in an electronic device which includes a memory configured to store first audio information and connection information indicative of at least one prior connection between the electronic device and a wireless device, wherein an audio communication through the at least one prior connection between the electronic device and the wireless device is based on the stored first audio information:

detecting a new connection between the electronic device and the wireless device, wherein the new connection is different from the at least one prior connection;

receiving second audio information from the wireless device based on the new connection, wherein
the second audio information is different from the stored first audio information, and
an audio setting of the wireless device is configured based on the second audio information;

controlling an image capture device to determine a number of sound sources close to the wireless device connected with the electronic device;

adjusting the stored first audio information based on the second audio information received from the wireless device and the determined number of sound sources; and transmitting an audio stream to the wireless device based on the adjusted first audio information.

11. The method according to claim 10, wherein the first audio information and the second audio information comprise at least one of volume level information, audio equalization information, or channel control information.

12. The method according to claim 10, further comprising:
determining that a first volume level indicated by the first audio information is higher than a second volume level indicated by the second audio information received from the wireless device;
increasing the first volume level, as the adjustment to the first audio information, based on the determination; and
transmitting the audio stream to the wireless device based on the increased first volume level.

13. The method according to claim 10, further comprising:
controlling the memory to re-store the adjusted first audio information; and
updating the connection information with information about the new connection between the electronic device and the wireless device.

14. The method according to claim 10, further comprising:
detecting a first geo-location of the wireless device;
adjusting the stored first audio information based on the detected first geo-location and the second audio information received from the wireless device; and
transmitting the audio stream to the wireless device based on the adjusted first audio information.

15. The method according to claim 10, further comprising:
detecting a second geo-location of the electronic device;
adjusting the stored first audio information based on the detected second geo-location and the second audio information received from the wireless device; and transmitting the audio stream to the wireless device based on the adjusted first audio information.

16. The method according to claim 10, further comprising:
determining user profile information which indicates a user associated with one of the electronic device or the wireless device connected with the electronic device;
adjusting the stored first audio information based on the determined user profile information; and
transmitting the audio stream to the wireless device based on the adjusted first audio information.

17. The method according to claim 10, further comprising:
determining battery information associated with a battery of at least one of the electronic device or the wireless device;
adjusting the stored first audio information based on the determined battery information; and
transmitting the audio stream to the wireless device based on the adjusted first audio information.

18. A non-transitory computer-readable medium having stored thereon, computer-executable instructions that when executed by an electronic device, causes the electronic device to execute operations, the operations comprising:
in the electronic device which includes a memory configured to store first audio information and connection information indicative of at least one prior connection between the electronic device and a wireless device, wherein an audio communication through the at least one prior connection between the electronic device and the wireless device is based on the stored first audio information:
detecting a new connection between the electronic device and the wireless device, wherein the new connection is different from the at least one prior connection;
receiving second audio information from the wireless device based on the new connection, wherein
the second audio information is different from the stored first audio information, and
an audio setting of the wireless device is configured based on the second audio information;
controlling an image capture device to determine a number of sound sources close to the wireless device connected with the electronic device;
adjusting the stored first audio information based on the second audio information received from the wireless device and the determined number of sound sources; and
transmitting an audio stream to the wireless device based on the adjusted first audio information.

* * * * *